US010876045B2

(12) United States Patent
Holtsclaw et al.

(10) Patent No.: US 10,876,045 B2
(45) Date of Patent: Dec. 29, 2020

(54) SUBTERRANEAN STIMULATION OPERATIONS UTILIZING DEGRADABLE PRE-COATED PARTICULATES

(71) Applicant: Halliburton Energy Services, Inc., Houston, TX (US)

(72) Inventors: Jeremy A. Holtsclaw, Kingwood, TX (US); Larry Steven Eoff, Porter, TX (US); Nathan Carl Schultheiss, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/760,214

(22) PCT Filed: Nov. 16, 2015

(86) PCT No.: PCT/US2015/060785
§ 371 (c)(1),
(2) Date: Mar. 14, 2018

(87) PCT Pub. No.: WO2017/086905
PCT Pub. Date: May 26, 2017

(65) Prior Publication Data
US 2018/0258344 A1     Sep. 13, 2018

(51) Int. Cl.
*E21B 43/26*     (2006.01)
*C09K 8/92*      (2006.01)
(Continued)

(52) U.S. Cl.
CPC .................. *C09K 8/92* (2013.01); *C09K 8/88* (2013.01); *C09K 8/882* (2013.01); *C09K 8/885* (2013.01); *C09K 8/905* (2013.01); *E21B 43/26* (2013.01)

(58) Field of Classification Search
CPC . C09K 8/92; C09K 8/88; C09K 8/882; C09K 8/885; C09K 8/905; E21B 43/26
See application file for complete search history.

(56) References Cited

U.S. PATENT DOCUMENTS 3,480,084 A    11/1969   Eilers
6,994,166 B2   2/2006   Huang et al.
(Continued)

OTHER PUBLICATIONS

International Search Report and Written Opinion from PCT/US2015/060785, dated Dec. 31, 2015, 12 pages.

*Primary Examiner* — Silvana C Runyan
(74) *Attorney, Agent, or Firm* — McGuirewoods, LLP

(57) ABSTRACT

Degradable particulates may allow for temporary redirection or occlusion of a fluid within a subterranean formation. However, many types of degradable particulates can be problematic for large-scale use, such as during subterranean treatment operations. Methods for treating a subterranean formation using degradable particulates may comprise: providing pre-coated particulates comprising a latently dissolvable core and a transient coating surrounding the latently dissolvable core, the latently dissolvable core and the transient coating comprising different materials; and introducing a treatment fluid comprising a carrier fluid and a plurality of the pre-coated particulates into a wellbore penetrating a subterranean formation in conjunction with a stimulation operation, a material comprising the latently dissolvable core being soluble in the carrier fluid or a formation fluid present within the subterranean formation.

17 Claims, 2 Drawing Sheets

(51) Int. Cl.
*C09K 8/88* (2006.01)
*C09K 8/90* (2006.01)

(56) References Cited

U.S. PATENT DOCUMENTS

| | | | |
|---|---|---|---|
| 7,902,124 B2 * | 3/2011 | Ali | C09K 8/528 |
| | | | 166/304 |
| 8,109,335 B2 | 2/2012 | Luo et al. | |
| 2006/0175059 A1 | 8/2006 | Sinclair et al. | |
| 2006/0185848 A1 | 8/2006 | Surjaatmadja et al. | |
| 2009/0151938 A1 * | 6/2009 | Conkle | E21B 7/00 |
| | | | 166/254.1 |
| 2010/0216672 A1 | 8/2010 | Todd | |
| 2011/0005761 A1 * | 1/2011 | Luo | C09K 8/035 |
| | | | 166/308.2 |
| 2012/0279704 A1 | 11/2012 | Eoff et al. | |
| 2012/0285692 A1 * | 11/2012 | Potapenko | E21B 43/26 |
| | | | 166/308.1 |
| 2013/0048282 A1 | 2/2013 | Adams et al. | |
| 2014/0054034 A1 * | 2/2014 | Nguyen | C09K 8/50 |
| | | | 166/280.2 |
| 2018/0149008 A1 * | 5/2018 | Nguyen | C09K 8/66 |

* cited by examiner

SUBTERRANEAN STIMULATION OPERATIONS UTILIZING DEGRADABLE PRE-COATED PARTICULATES

BACKGROUND

The present disclosure generally relates to subterranean stimulation operations and, more specifically, to treatment fluids and methods utilizing particulate materials.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof will refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, diverting operations, the like, and any combination thereof.

Diverting operations may be conducted within a subterranean formation, for example, when multiple subterranean zones are present, each possibly having different effective permeabilities, and contact of a treatment fluid with only some of the subterranean zones is desired. Diverting operations may likewise be conducted when fluid loss to a portion of a subterranean formation is excessive, such as fluid loss to a thief zone or a highly fractured zone, and insufficient treatment fluid contact with a desired portion of the subterranean formation results. As used herein, the term "fluid loss" will refer to the unwanted or unintended passage of a treatment fluid into the matrix or fractures of a subterranean formation. Regardless of its origin, improper fluid placement in a subterranean formation can have significant ramifications including, for example, over-stimulation of an undesired subterranean zone, under-stimulation of a desired subterranean zone, formation damage, and/or increased costs due to inefficient treatment fluid usage.

Downhole fluid diversion may take place through a variety of means including, for example, packers, fluid diverters, and particulate diverters. Fluid diverters employ very viscous chemical compositions that may block secondary fluid flow at locations where they reside in a subterranean formation, thereby redirecting the secondary fluid flow to another location. Although fluid diverters are relatively easy to deploy in a treatment operation, they may provide incomplete secondary fluid diversion, and de-viscosification and ensuing loss of fluid diversion capabilities may be problematic at higher formation temperatures. Packers and particulate diverters, in contrast, may form robust, solid physical barriers that present a significant impediment to unwanted fluid flow. Whereas packers are placed in the wellbore itself to exclude fluid flow to an undesired location, particulate diverters are more commonly deployed within the matrix or fractures of the subterranean formation to reduce the formation's permeability at the deployment location and to redirect fluid flow to another location. Illustrative treatment operations in which particulate diverters may be incorporated include drilling operations, stimulation operations (e.g., fracturing operations and acidizing operations), and cementing operations.

Particulate diverters may be degradable or non-degradable depending upon the circumstances of a particular treatment operation. Permanent fluid diversion may be desirable in some instances, and non-degradable particulate diverters may be sufficient for this purpose. Temporary fluid diversion may also be a commonly desired result. Although temporary fluid diversion may be accomplished with non-degradable particulate diverters (e.g., by performing a cleanup process to remove the particulate diverters actively once fluid diversion is no longer required), the cleanup process may considerably add to the time and expense needed to conduct a treatment operation. Degradable particulate diverters may temporarily promote fluid diversion before the particulates break down. As used herein, the terms "degrade," "degradable," and other grammatical variants thereof will refer to any of a variety of breakdown processes through which a particulate material changes its original particulate character or loses its particulate character altogether, including, for example, dissolution, chemical reactivity, biological reactivity, deformation, melting, or any combination thereof. The change or loss of particulate character may render the particulates ineffective for promoting further fluid diversion and possibly restore at least some of the original flow pathways in the subterranean formation.

Although a variety of degradable materials are available, some are expensive and many do not form particulate materials that are easily used downhole. For example, some degradable materials may be excessively soluble or form particulates that readily agglomerate during storage or upon placement in a treatment fluid, either condition possibly compromising one's ability to deploy the particulates in a desired location within a subterranean formation. Some degradable materials can also leave behind a residue upon undergoing degradation, which can sometimes lead to ineffective restoration of the original flow pathways in a subterranean formation. In many instances, degradable materials that are particularly desirable in one aspect may be deficient in another, as discussed further below.

As indicated above, deposition of a residue in a subterranean formation upon a degradation of a degradable material can be highly undesirable due to the occurrence of formation damage. Readily dissolvable materials such as soluble salt crystals (e.g., crystalline NaCl, also known as "rock salt") and biopolymer particulates may deposit minimal residue upon undergoing dissolution, and they can be desirable for use in a subterranean formation as a result. However, the ready solubility of these materials can render them very difficult to deploy in particulate form. In the case of a dissolvable material that is soluble in a treatment fluid, for example, the treatment fluid conventionally needs to be saturated in the dissolvable material before the dissolvable material can remain in particulate form for conveyance into a wellbore. Rock salt, for example, has a fresh water solubility exceeding 35 g per 100 mL, particularly at elevated temperatures, which may preclude direct incorporation of this diverting agent in fresh water or saline-based treatment fluids. At the very least, the degradable material used for saturating the treatment fluid is used inefficiently and at added cost, since the dissolved fraction of the degradable material simply progresses through the wellbore and does not promote fluid diversion. Moreover, the resulting high salt content in the treatment fluid may preclude the treatment fluid from undergoing viscosification and high treatment fluid densities may result, both of which may be undesirable for some types of treatment fluids or treatment operations. Related issues may similarly be encountered when utilizing other types of readily dissolvable materials for conducting subterranean treatment operations.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
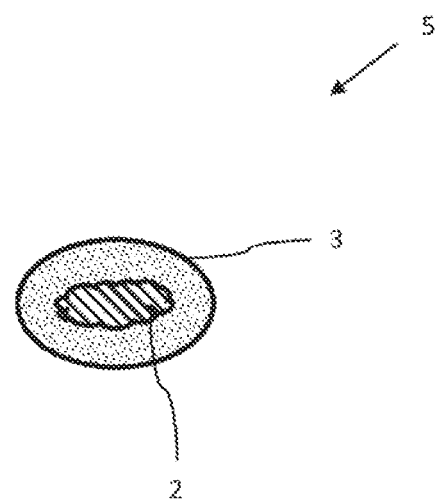
FIG. 1 shows an illustrative schematic of a pre-coated particulate having a latently dissolvable core and a transient coating.

The present disclosure generally relates to subterranean stimulation operations and, more specifically, to treatment fluids and methods utilizing particulate materials.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

Although degradable particulates may be desirable for use in conjunction with various subterranean treatment operations, their use is often not without challenges. Degradable particulates comprising readily dissolvable materials, for example, may be especially difficult to use. Specifically, the presence of readily dissolvable materials in conventional degradable particulates may make these entities problematic to deploy without saturating a treatment fluid in the dissolvable material in order to maintain a particulate state. This represents an inefficient use of resources, even for degradable particulates comprising inexpensive substances, and may increase treatment costs to an unacceptable degree. Further, when saturating a treatment fluid with some substances, such as soluble salts, the treatment fluid may no longer have properties that are desirable for some situations, such as an inability to undergo viscosification and/or unacceptably high densities.

The present inventors discovered that readily dissolvable materials may be enveloped within a transient coating that makes them temporarily less dissolvable and easier to use during deployment in a subterranean formation, such as during a diverting operation or a related fluid loss control operation. As used herein, the term "transient" will refer to a coating that is removable and persists for only a certain length of time. In particular, the inventors discovered that by pre-coating a readily dissolvable material with a transient coating, a particulate diverter with a latently dissolvable core may be produced. The transient coating may be partial or complete. In either case, the particulate diverter may have a sufficient lifetime to promote fluid diversion before undergoing degradation and losing its particulate nature. The transient coating may be selected for loss at a desired time and/or under a desired set of conditions such that the latently dissolvable core persists long enough for effective downhole delivery and functioning to take place. The overall degradation process may involve loss of the transient coating at a desired time (e.g., within a period of about 1 hour to about 3 hours after introduction to the subterranean formation) to expose the underlying latently dissolvable core, which may then undergo ready dissolution to complete the particulate degradation process. The time over which the degradation process takes place may be sufficient to divert a treatment fluid in conjunction with a stimulation operation. Moreover, the transient coating and the latently dissolvable core may be selected such that they leave minimal or no residue upon their removal or dissolution and are substantially non-damaging to a subterranean formation as a result.

Pre-coating a latently dissolvable core with a transient coating having differing properties may produce degradable particulates with a number of additional advantages further to those alluded to above. In the case of water-soluble salts, for example, pre-coating a transient coating upon a latently dissolvable core comprising the water-soluble salt may allow fresh water or lower-salinity water sources to be used in the course of formulating a treatment fluid. This feature may decrease treatment costs by lowering the amount of water-soluble salt that would otherwise be needed for saturating the treatment fluid, as well as permitting the treatment fluid to be more readily viscosified. Further, upon dissolution of the latently dissolvable core in such embodiments, the dissolved salt may help preclude clay swelling issues when the pre-coated particulates are introduced to a clay-containing subterranean formation. The material comprising the latently dissolvable core may also be selected to preclude precipitation of certain divalent metal ions in the subterranean formation, as discussed further below.

Materials comprising the latently dissolvable core may further be selected such that the core undergoes ready dissolution under the particular conditions that are present in a treatment fluid or in a subterranean formation in which the pre-coated particulates are present. This feature allows the performance of the pre-coated particulates to be readily tuned. Moreover, materials comprising the latently dissolvable core may be chosen from among those that provide ready fluid diversion in their uncoated state. Hence, incorporation of the pre-coated particulates of the present disclosure in various treatment operations may not require significant alteration of existing treatment protocols.

The material comprising the transient coating may be selected such that it undergoes active or passive removal in the course of exposing the underlying latently dissolvable core. Active processes may involve adding a substance to the wellbore to promote removal of the transient coating (e.g., in a cleanup process). Passive removal, in contrast, may take place due to interaction of the transient coating with a component of a treatment fluid carrying the pre-coated particulates or with a wellbore fluid. Similarly, exposure of the transient coating to certain conditions in the wellbore (e.g., particular thermal conditions) may be sufficient to affect passive removal of the transient coating. In either case, the transient coating may be selected to affect its removal at a desired time and/or to convey a desired reactivity profile to the pre-coated particulates. For example, the transient coating may be selected to provide a desired degree of resistance toward acids when used in conjunction with an acidizing operation. Alternately, the transient coating may be reactive toward acids, such that the transient coating undergoes slow degradation in the presence of acids and is removed at a desired time in order to promote dissolution of the latently dissolvable core upon completion of the acidizing operation. Further disclosure regarding suitable materials for the transient coating are discussed hereinbelow.

The transient coating may also provide further advantageous benefits in addition to mitigating dissolution of the latently dissolvable core and allowing fluid diversion to be realized. For example, in some embodiments, the transient coating may be selected to provide further downhole functionality, if desired. In a non-limiting example, a functional material (e.g., a scale inhibitor, a corrosion inhibitor, or a related treatment chemical) may be incorporated within the transient coating in order to perform a further downhole function upon its removal from the pre-coated particulates. The transient coating may consist of or consist essentially of the functional material, or the functional material may be admixed with another material that mitigates dissolution of the latently dissolvable core. The material comprising the latently dissolvable core likewise may provide similar secondary advantages, as also discussed herein.

As a still further advantage, the pre-coated particulates of the present disclosure may be more mechanically robust than are the corresponding uncoated materials comprising the latently dissolvable core. For example, rock salt crystals are relatively prone toward fragmentation during pumping of a treatment fluid. Upon undergoing fragmentation, the rock salt crystals may no longer have a size where they can effectively promote fluid diversion. Rock salt crystals and other latently dissolvable cores that are pre-coated with a transient coating, in contrast, may be significantly less frangible. In addition, the thickness of the transient coating may be modulated to adjust the overall size of the pre-coated particulates so that they perform as intended in a particular treatment operation.

As indicated above, fluid diversion and fluid loss control may share several features in common with one another. Accordingly, the pre-coated particulates described herein may, in some embodiments, provide for fluid loss control by forming a temporary fluid seal within the wellbore, such as within the porous features or fractures of the subterranean matrix, in order to block the passage of fluids therethrough. Fractures may be naturally occurring within the subterranean formation or they may be created de novo during a fracturing operation. Once fluid loss control is no longer needed, the fluid seal may be allowed to lose integrity by at least partially degrading the pre-coated particulates comprising the fluid seal (i.e., by removing the transient coating and dissolving the latently dissolvable core). Complete removal of the transient coating and/or complete dissolution of the latently dissolvable core need not necessarily take place to break the integrity of the fluid seal. Even partial removal and/or dissolution of these materials may be sufficient to decrease the particulate size to an extent that the particulates are no longer able to bridge a porosity-enhancing feature of the subterranean matrix.

In various embodiments, pre-coated particulates of the present disclosure may comprise a latently dissolvable core and a transient coating surrounding the latently dissolvable core. FIG. 1 shows an illustrative schematic of pre-coated particulate 5 having latently dissolvable core 2 and transient coating 3 upon latently dissolvable core 2. Particular examples of materials that may comprise latently dissolvable core 2 and transient coating 3 are discussed hereinafter.

The pre-coated particulates disclosed herein are not considered to be particularly limited in their shape or their size.

In some embodiments, the pre-coated particulates may be substantially spherical. In other non-limiting embodiments, the pre-coated particulates may have a shape selected from among ovular- or substantially ovular-shaped, discus-shaped, platelet-shaped, flake-shaped, toroidal-shaped, dendritic-shaped, needle-shaped (acicular-shaped), rod-shaped, or prismatic-shaped. In some embodiments, the shape of the pre-coated particulates may mimic that of the latently dissolvable core. In other embodiments, the pre-coated particulates may deviate from that of the latently dissolvable core. In some or other embodiments, the pre-coated particulates may range from about 1 micron to about 25 millimeters in size.

In some embodiments, the latently dissolvable core may comprise a material that is substantially soluble in the carrier fluid of a treatment fluid used for conveying the pre-coated particulates into a subterranean formation. In other various embodiments, the latently dissolvable core may be soluble in a wellbore fluid, such as petroleum. In more specific embodiments, the latently dissolvable core may comprise a material that is soluble in an aqueous fluid. In still more specific embodiments, the latently dissolvable core may comprise a crystalline material or a non-crystalline material that can be effectively compacted into a coherent mass having a desired pre-coating size. Illustrative materials that are soluble in aqueous fluids and may suitably comprise the latently dissolvable core include, for example, water-soluble salts, sugars, and any combination thereof. Suitable water-soluble salts may include, for example, rock salt (sodium chloride), potassium chloride, calcium chloride, magnesium chloride, ammonium chloride, sodium acetate, sodium formate, sodium lactate, potassium acetate, potassium formate, potassium lactate, the like, and any combination thereof. Ammonium and organic salts, for example, may provide additional benefits in terms of their clay stabilization properties. Organic salts, such as acetates and lactates, may also decrease the incidence of precipitation from compounds containing divalent metal ions, such as calcium and other divalent metal ions. Suitable sugars are similarly not believed to be particularly limited and may comprise any sugar upon which the transient coating may be disposed.

In some embodiments, the transient coating may comprise any material that is capable of undergoing self-removal from the latently dissolvable core. The mechanism whereby the transient coating undergoes removal is not considered to be particularly limited and may include dissolution, melting, chemical or physical degradation, deformation, or any combination thereof. Dissolution-based removal may result from contact of the transient coating with a treatment fluid or a wellbore fluid, such as petroleum. In such embodiments, the transient coating may simply dissolve in the contacting fluid and expose a surface of the underlying latently dissolvable core. The fluid affecting dissolution of the transient coating may be the same as or different than the fluid subsequently affecting dissolution of the latently dissolvable core. In related approaches, the transient coating may be removable by undergoing a chemical reaction with a treatment fluid or a wellbore fluid. In such reaction-based approaches, the reaction product may become soluble in the fluid that induces the chemical reaction or in another fluid, or the reaction product may be carried away in insoluble form from the latently dissolvable core in a fluid flow. Illustrative chemical degradation processes may include, for example, hemolytic bond cleavage, heterolytic bond cleavage, functionalization, or any combination thereof.

The transient coating may also be removable by melting upon exposure to elevated temperatures within the wellbore.

Such approaches may allow formation of the pre-coated particulates at lower temperatures on or near the earth's surface before being conveyed into the wellbore. Upon completion of the pre-coated particulates' fluid diversion or fluid loss control functionality, the transient coating may melt upon extended exposure to elevated formation temperatures, such that the coating material is no longer adherent and exposes the latently dissolvable core. Increased solubility and chemical reactivity of the transient coating may similarly be realized upon exposure to elevated formation temperatures. The particular material for a given transient coating and its melting point may be selected in response to the thermal conditions to which the transient coating will ultimately be exposed. Suitable materials for the transient coating that may melt upon exposure to elevated formation temperatures are discussed further hereinbelow.

In still other alternative approaches, the transient coating may be removable by exposing the pre-coated particulates to a secondary treatment fluid that has different solubility or reactivity properties toward the transient coating than does the treatment fluid used for conveying the pre-coated particulates into the wellbore. Hence, in some embodiments, removal of the transient coating may be akin to a cleanup process. Upon removal of the transient coating with the secondary treatment fluid, the dissolvable core may then undergo dissolution by any suitable fluid in accordance with the further disclosure herein.

Processes for producing the pre-coated particulates of the present disclosure are not considered to be particularly limited. In illustrative embodiments, suitable processes for producing the pre-coated particulates may include, for example, fluidized bed coating processes, spray coating processes, tablet coating processes, the like and any combination thereof. In more specific embodiments, a Wurster process or modified Wurster process may be used for producing the pre-coated particulates of the present disclosure.

In more particular embodiments, the pre-coated particulates of the present disclosure may be incorporated in a treatment fluid. Such treatment fluids may comprise a carrier fluid and a plurality of pre-coated particulates, where the pre-coated particulates comprise a latently dissolvable core and a transient coating surrounding the latently dissolvable core. In more specific embodiments, the latently dissolvable core may comprise a material that is otherwise soluble in the carrier fluid and differs from the transient coating.

In some embodiments, the carrier fluid may comprise an aqueous carrier fluid and the latently dissolvable core may comprise a material that is soluble in the aqueous carrier fluid. Suitable aqueous carrier fluids may include, for example, fresh water, treated water, recycled water, ground water, flowback water, produced water, brackish water, acidified water, salt water, seawater, brine (e.g., a saturated salt solution), or an aqueous salt solution (e.g., a non-saturated salt solution). Aqueous carrier fluids may be obtained from any suitable source. Given the benefit of the present disclosure, one of ordinary skill in the art will be able to determine an appropriate aqueous carrier fluid and amount thereof for utilization in the embodiments described herein.

Although saturated aqueous salt solutions (i.e., brines) may be suitably used in the various embodiments of the present disclosure, aqueous carrier fluids having a lower salt content may be more desirable for the reasons discussed above, particularly when employing pre-coated particulates having a water-soluble salt as their core material. Specifically, a lower salt content in the aqueous carrier fluid may promote dissolution of the latently dissolvable core upon removal of the transient coating. Even when using a saturated aqueous salt solution in conjunction with pre-coated particulates containing a water-soluble salt core material, there may still be advantages compared to just using the uncoated core material alone.

In some embodiments, an organic co-solvent may be included with an aqueous carrier fluid. Suitable organic co-solvents may be miscible with the aqueous carrier fluid and include solvents such as, but not limited to, glycols and alcohols. When present, the amount of the organic co-solvent may range between about 1% to about 50% by volume of the treatment fluid. Considerations for including an organic co-solvent along with an aqueous carrier fluid may include, for example, promoting removal of the transient coating at a desired rate and/or via a desired mechanism, promoting dissolution of the latently dissolvable core, and other factors that will be familiar to one having ordinary skill in the art.

As discussed in brief above, suitable materials comprising the latently dissolvable core may include substances that are soluble in aqueous fluids in some embodiments. In more particular embodiments, the material comprising the latently dissolvable core may comprise a substance that is otherwise soluble in fresh water or a non-saturated aqueous salt solution. In some embodiments, suitable materials that may comprise the latently dissolvable core include water-soluble salts, sugars or any combination thereof. Use of a water-soluble salt within the latently dissolvable core may help promote clay stabilization upon dissolution of the core, for example. Other secondary benefits may also be realized, as discussed herein.

Suitable water-soluble salts that may comprise the latently dissolvable core are not considered to be particularly limited, provided that the chosen salt does not interfere with other aspects of an ongoing treatment operation. In illustrative embodiments, suitable water-soluble salts that may be present in the latently dissolvable core include, for example, sodium chloride, potassium chloride, calcium chloride, magnesium chloride, ammonium chloride, and tetraalkylammonium chloride. The corresponding bromides, iodides, formates, acetates or other soluble anionic forms may be used similarly. Likewise, other cations that produce water-soluble salts may also be used. Sodium chloride may be in the form of rock salt in some embodiments. The choice of a particular water-soluble salt for a given application may depend, for instance, upon the treatment operation being conducted and the type of subterranean formation undergoing treatment. For example, when acidizing a siliceous formation with hydrofluoric acid, the introduction of calcium ions into the wellbore environment may be undesirable due to the potential for forming highly insoluble calcium fluoride, whereas sodium ions and particularly ammonium ions may be considerably less problematic. Thus, when used in conjunction with an acidizing operation performed with hydrofluoric acid, the pre-coated particulates of the present disclosure may desirably comprise a latently dissolvable core containing an ammonium or tetraalkylammonium salt to mitigate undesired precipitation reactions.

Suitable sugars that may comprise the latently dissolvable core are likewise not considered to be particularly limited. In illustrative embodiments, suitable sugars that may comprise the latently dissolvable core include, for example, sugars that are readily crystallizable. Sucrose, for example, may be readily crystallized from a supersaturated solution to form "rock candy." Such crystallized sugar particulates may be utilized for forming the latently dissolvable core in the pre-coated particulates described herein.

The transient coating of the pre-coated particulates may similarly comprise a wide range of materials. In various embodiments, the transient coating may comprise a substance that degrades, dissolves, melts, or any combination thereof in a wellbore. These processes may occur upon contact of the transient coating with a treatment fluid or a wellbore fluid, or they may occur independently of fluid contact. In more particular embodiments, the transient coating may comprise a substance selected from the group consisting of a lipid, an enteric coating, a degradable polymer, or any combination thereof. As indicated above, the transient coating for a given application may be chosen in response to particular conditions that are present in a given wellbore and/or in a treatment fluid being used to transport the pre-coated particulates. Suitable examples of materials that may comprise the transient coating are discussed hereinafter.

Lipids include substances having long-chain (>10 carbon atoms) alkyl groups. Suitable lipids for use in the embodiments of the present disclosure may include, for example, fats, fatty acids, fatty alcohols, fatty esters, natural waxes, paraffin waxes, sterols, monoglycerides, diglycerides, triglycerides, phospholipids, and the like. In various embodiments, suitable lipids may include those that have a melting point above about 75° F., more desirably above about 100° F., such that the transient coating may remain in solid form during storage of the pre-coated particulates prior to their introduction into a wellbore. Upon being introduced to a wellbore, lipids suitable for use in conjunction with the present disclosure may melt upon exposure to elevated formation temperatures, or they may undergo dissolution upon exposure to a component of oil in the wellbore. In other various embodiments, an oleaginous treatment fluid may be introduced to the wellbore following introduction of the pre-coated particulates in order to affect at least partial dissolution of the transient coating. In still other embodiments, lipids may undergo chemical degradation, such as through hemolytic or heterolytic bond cleavage, and/or through chemical functionalization that promotes removal of the transient coating from the latently dissolvable core.

In more particular embodiments, the transient coating may comprise a wax. Suitable waxes may comprise waxes such as animal waxes, plant waxes, mineral waxes, petroleum waxes, synthetic waxes, or any combination thereof. Non-limiting examples of suitable waxes may include, for example, beeswax, lanolin, shellac, carnauba wax, castor wax, soy wax, tallow tree wax, ozocerite, paraffin wax, petroleum jelly, and the like. In some embodiments, petroleum waxes, such as paraffin waxes, may comprise a mixture of 20-carbon to 40-carbon aliphatic hydrocarbon molecules that are obtained from petroleum, shale or oil sources.

The transient coatings may comprise an enteric coating in some embodiments. As used herein, an "enteric coating" will refer to a polymeric coating material that is insoluble at low pH values and becomes soluble upon reaching higher pH values, particularly a pH of about 7 or above. Accordingly, enteric coatings may be particularly desirable for use in conjunction with an acidizing operation, such that the pre-coated particulates serve an intended diversion function at low pH and then become soluble as the acid spends and the pH rises. Suitable enteric coatings may comprise any combination of natural or synthetic materials such as, for example, (meth)acrylic acid polymers and copolymers, cellulose acetate succinate, hydroxypropyl methylcellulose phthalate, hydroxypropyl methylcellulose acetate succinate, polyvinyl acetate phthalate, shellac, cellulose acetate trimellitate, alginate polymers, and zein. In illustrative embodiments, suitable enteric coatings may remain intact below a pH value of about 7 and become soluble in a pH range of about 7-9.

Some non-polymeric substances may display a solubility profile similar to that of enteric coatings and may likewise comprise the transient coating. For example, in some embodiments, the transient coating may comprise one or more fatty acids, which may similarly be insoluble at low pH values but become more soluble as the pH increases.

In some embodiments, the transient coating may comprise a degradable polymer. Degradable polymers that may be used in conjunction with the various embodiments of the present disclosure include, for example, polysaccharides, proteins, polyesters (particularly aliphatic polyesters), poly (hydroxyalkanoates), poly(β-hydroxyalkanoates), poly(ω-hydroxy alkanoates), polylactides, polyglycolides, poly(ε-caprolactone)s, poly(hydroxybutyrate)s, poly(alkylene dicarboxylates), polyanhydrides, poly(hydroxy ester ether)s, poly(ether ester)s, poly(ester amide)s, polycarbamates (i.e., polyurethanes), polycarbonates, poly(orthoester)s, poly (amino acid)s, poly(ethylene oxide), polyphosphazenes, polyvinyl alcohol, methylcellulose, ethylcellulose, carboxymethyl cellulose, carboxyethyl cellulose, acetyl cellulose, hydroxyethyl cellulose, shellac, dextran, guar, xanthan, starch, a scleroglucan, a diutan, poly(vinylpyrrolidone), polyacrylamide, polyacrylic acid, poly(diallyldimethylammonium chloride), poly(ethylene glycol), polylysine, polymethacrylamide, polymethacrylic acid, poly(vinylamine), poly(vinylidene chloride), any derivative thereof, any copolymer thereof, any salt thereof, and any combination thereof. Copolymers may include random, block, graft, and/or star copolymers in various embodiments. The degradable polymers may degrade in the subterranean formation by any accessible degradation mechanism.

In another illustrative embodiment, a suitable degradable polymer may comprise poly(cyclopentadiene). This polymer may degrade thermally at elevated temperatures by undergoing a retro Diels-Alder reaction, thereby exposing the latently dissolvable core. Other polymers that thermally degrade by this degradation mechanism or by any other type of thermal degradation process may be used similarly.

In some embodiments, suitable degradable polymers for inclusion in the transient coating may comprise an acid-degradable polymer. In some embodiments, a suitable acid-degradable polymer may comprise a polylactide or an aliphatic polyester. In still more particular embodiments, a suitable acid-degradable polymer may comprise polylactic acid, any derivative thereof, or any combination thereof. The polylactic acid may be of the L-configuration, the D-configuration, or any combination thereof, and the chosen configuration may impact the degradation rate of the transient coating. Without being bound by any theory or mechanism, the configuration or mixture of configurations of the lactic acid monomers in the polylactic acid may impact the polymer's crystallinity, which may, in turn, affect the degradation rate of the transient coating. Combinations of the L- and D-configurations may comprise a racemic mixture, or one configuration may be present in excess over the other. The degradation rate may also be a function of the temperature conditions to which the polylactic acid is exposed. Polyglycolic acid may be used in a similar manner to polylactic acid in the embodiments of the present disclosure.

Other suitable materials that may comprise at least a portion of the transient coating include, for example, dehydrated compounds. Dehydrated compounds may slowly hydrate over time and become soluble in a manner similar to that described above. Dehydrated borates such as, for example, anhydrous sodium tetraborate (anhydrous borax) and anhydrous boric acid are among the dehydrated compounds that may comprise at least a portion of the transient coating in some embodiments of the present disclosure. These initially insoluble borates can slowly rehydrate and become considerably more soluble over a timeframe of about 8 hours to about 72 hours, depending upon the temperature to which they are exposed.

Still other suitable materials that may comprise at least a portion of the transient coating include, for example, oil-soluble substances. Illustrative oil-soluble substances that may be used in conjunction with the embodiments of the present disclosure include, for example, poly(butadiene), polyisoprene, polyacrylics, polyamides, polyether urethanes, polyester urethanes, and polyolefins (e.g., polyethylene, polypropylene, polyisobutylene, and polystyrene), any copolymer thereof, and any combination thereof.

In additional embodiments, the treatment fluids described herein may further comprise any number of additives that are commonly used in downhole operations including, for example, silica scale control additives, chelating agents, surfactants, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, proppants, corrosion inhibitors, viscosifiers, weighting agents, solubilizers, pH control agents (e.g., buffers), hydrate inhibitors, consolidating agents, bactericides, catalysts, clay stabilizers, breakers, delayed release breakers, and the like. Any combination of these additives may be used as well. Given the benefit of the present disclosure, one having ordinary skill in the art will be able to formulate a treatment fluid having properties suitable for a given application.

Methods for using the pre-coated particulates described herein in conjunction with various subterranean treatment operations are also contemplated within the present disclosure. The pre-coated particulates may function in diverting a fluid in the subterranean formation in some embodiments or promote fluid loss control in other embodiments. The pre-coated particulates may be introduced to a wellbore in a treatment fluid, in which case the treatment fluid may be self-diverting in some embodiments or function to divert another treatment fluid in other embodiments.

In some embodiments, methods of the present disclosure may comprise: providing pre-coated particulates comprising a latently dissolvable core and a transient coating surrounding the latently dissolvable core; and introducing a treatment fluid comprising a carrier fluid and a plurality of the pre-coated particulates into a wellbore penetrating a subterranean formation in conjunction with a stimulation operation. The latently dissolvable core and the transient coating comprise different materials. A material comprising the latently dissolvable core is soluble in the carrier fluid or in a formation fluid present within the subterranean formation. As discussed above, the transient coating may protect the latently dissolvable core and preclude its dissolution until the transient coating has been removed downhole. In various embodiments, at least a portion of the pre-coated particulates may divert a fluid during the stimulation operation from a first location of the subterranean formation to a second location of the subterranean formation.

In more particular embodiments, the stimulation operation in which the pre-coated particulates of the present disclosure are used may comprise a fracturing operation or an acidizing operation. Accordingly, depending upon the type of stimulation operation being conducted, the pre-coated particulates of the present disclosure may be used in conjunction with a fracturing fluid or an acidizing fluid. The pre-coated particulates may divert the fracturing fluid or the acidizing fluid. Further disclosure in regard to acidizing fluids and fracturing fluids follows hereinbelow.

In some embodiments, the plurality of the pre-coated particulates may be present in the fracturing fluid or the acidizing fluid. Accordingly, in such embodiments, the pre-coated particulates may function in self-diverting the fracturing fluid or the acidizing fluid during the stimulation operation.

In other various embodiments, the plurality of the pre-coated particulates may be introduced into the wellbore before the fracturing fluid or the acidizing fluid is introduced. Accordingly, in such embodiments, the pre-coated particulates may form a barrier that then functions to divert the subsequently introduced fracturing fluid or acidizing fluid. The fluid diversion may provide fluid loss control in some embodiments.

In more particular embodiments, methods of the present disclosure may comprise: providing a treatment fluid comprising an aqueous carrier fluid and a plurality of pre-coated particulates; introducing the treatment fluid into a wellbore penetrating a subterranean formation; and diverting a fluid with at least a portion of the pre-coated particulates from a first location of the subterranean formation to a second location of the subterranean formation. The pre-coated particulates comprise a latently dissolvable core and a transient coating surrounding the latently dissolvable core. The latently dissolvable core comprises a material that is soluble in the aqueous carrier fluid and differs from the transient coating. In various embodiments, at least a portion of the plurality of the pre-coated particulates may divert a fluid in the subterranean formation or promote fluid loss control in the subterranean formation.

In further embodiments, methods of the present disclosure may comprise removing the transient coating from pre-coated particulates in the wellbore, thereby exposing a surface of the latently dissolvable core. Upon exposing the latently dissolvable core, the methods may further comprise dissolving the latently dissolvable core. Dissolution of the latently dissolvable core may take place using any of the fluids described hereinabove. In some embodiments, the latently dissolvable core may be dissolved by the treatment fluid used to convey the pre-coated particulates into the wellbore. In other embodiments, the latently dissolvable core may be dissolved by an acidizing fluid or a fracturing fluid that is diverted by the pre-coated particulates. In still other embodiments, the latently dissolvable core may be dissolved by a substance present in the wellbore to which the pre-coated particulates are introduced, such as formation water, petroleum, or any combination thereof. The process by which the latently dissolvable core becomes soluble may involve direct solubilization of the latently dissolvable core below its solubility limit, or the latently dissolvable core may undergo a chemical reaction in order to become more soluble.

In more specific embodiments, methods of the present disclosure may comprise dissolving the latently dissolvable core after a fluid has been diverted from a first location to a second location or after the pre-coated particulates have completed a function of promoting fluid loss control. Accordingly, after the pre-coated particulates have performed their intended function, the latently dissolvable core may undergo dissolution to restore the wellbore at least partially to its pre-treatment condition. That is, removal of the transient coating and the latently dissolvable core may restore at least a portion of the flow pathways that were originally present in the subterranean formation. In other illustrative instances, a fluid seal may be removed from the wellbore when fluid loss control is no longer necessary, and it is desired to produce a hydrocarbon resource from the matrix of the subterranean formation. In more specific embodiments, an aqueous carrier fluid of a treatment fluid may dissolve the latently dissolvable core. However, as discussed above, the pre-coated particulates of the present disclosure may be configured such that the transient coating and the latently dissolvable core undergo removal and dissolution, respectively, under any particular set of conditions that may be encountered in the wellbore. For example, in other various embodiments, a formation fluid present within the subterranean formation may dissolve the latently dissolvable core.

In some embodiments, the pre-coated particulates of the present disclosure may be used in conjunction with an acidizing operation using an acidizing fluid. As discussed above, the pre-coated particulates of the present disclosure may be present in the acidizing fluid, or they may be present in another treatment fluid used in conjunction with the acidizing fluid (e.g., to divert the acidizing fluid or to promote fluid loss control of the acidizing fluid).

Acidizing fluids may be used to stimulate a subterranean formation by dissolving a portion of the matrix of the subterranean formation in order to increase its permeability. The acidizing fluid may be configured for acidizing a carbonate formation or a siliceous formation, and the pre-coated particulates of the present disclosure may be suitably used in either type of subterranean formation. Again, the materials comprising the transient coating and/or the latently dissolvable core may be chosen to accommodate the particular thermal and/or chemical conditions present in a given wellbore in which the acidizing fluid is to be used.

Carbonate formations can contain minerals that comprise a carbonate anion (e.g., calcite (calcium carbonate), dolomite (calcium magnesium carbonate), siderite (iron carbonate) and like minerals). When acidizing a carbonate formation, acidity of the treatment fluid alone may often be sufficient to solubilize a carbonate material by decomposing the carbonate anion to carbon dioxide and forming dissolved metal cations. Both mineral acids and organic acids may be used to treat a carbonate formation in this respect, often with similar degrees of success. Illustrative mineral acids and organic acids that may be present in an acidizing fluid for carbonate formations may include, but are not limited to, hydrochloric acid, hydrobromic acid, formic acid, acetic acid, methanesulfonic acid, trifluoromethanesulfonic acid, and any combination thereof. Acid-generating compounds, illustrative examples of which are discussed below, may be used in a similar manner to generate an acid in situ within the subterranean formation.

Siliceous formations contain minerals such as, for example, zeolites, clays, feldspars and sandstone. As used herein, the term "siliceous" will refer to a substance having the characteristics of silica, including silicates and/or aluminosilicates. The acids that can effectively dissolve carbonate materials may have little effect on siliceous materials. Hydrofluoric acid, in contrast, can react very readily with siliceous materials to promote their dissolution. Oftentimes, a secondary mineral acid or organic acid can be used in conjunction with hydrofluoric acid to maintain a low pH state as the hydrofluoric acid becomes spent during dissolution of a siliceous material, where the low pH state helps promote continued solubilization of the siliceous material. Hydrofluoric acid precursors may also be used in acidizing fluids configured for acidizing siliceous formations, and they may likewise be used in combination with other acids or acid-generating compounds, if desired.

More particular examples of acids suitable for inclusion in acidizing fluids configured for treating either type of subterranean formation may include, for example, hydrochloric acid, hydrobromic acid, formic acid, acetic acid, chloroacetic acid, dichloroacetic acid, trichloroacetic acid, fluoroacetic acid, difluoroacetic acid, trifluoroacetic acid, methanesulfonic acid, citric acid, maleic acid, glycolic acid, lactic acid, malic acid, oxalic acid, the like, and any combination thereof. Examples of acid-generating compounds that may be suitable for use in the acidizing fluids include, but are not limited to, esters, aliphatic polyesters, orthoesters, poly (orthoesters), poly(lactides), poly(glycolides), poly(t-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, the like, any derivative thereof, and any combination thereof.

In some embodiments, mineral acids may be present in the acidizing fluids in an amount ranging between about 1% and about 20% of the acidizing fluid by weight, or in an amount ranging between about 1% and about 15% of the acidizing fluid by weight, or in an amount ranging between about 5% and about 10% of the acidizing fluid by weight. Higher mineral acid concentrations may be used as well. Since organic acids are generally less acidic than are mineral acids, the organic acid may comprise up to about 25% of an acidizing fluid by weight, particularly between about 1% and about 25% of the acidizing fluid by weight, or between about 10% and about 20% of the acidizing fluid by weight. Acid-generating compounds may be used to produce acids at similar concentration values. The acidizing fluids can have a pH value of about 4 or lower, or about 3.5 or lower, or about 3 or lower, or about 2.5 or lower, or about 2 or lower, or about 1.5 or lower, or about 1 or lower. In more particular embodiments, the pH may range between about 0 and about 4, or between about 1 and about 4, or between about 1 and about 3, or between about 2 and about 4.

In acidizing fluids configured for acidizing of a siliceous formation, a hydrofluoric acid precursor may be used in conjunction with hydrofluoric acid or instead of hydrofluoric acid. Suitable hydrofluoric acid precursors that may be utilized in the various embodiments of the present disclosure include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), perfluorinated organic compounds, titanium fluorides (e.g., $TiF_4$ and $TiF_6^{2-}$), cesium fluoride, boron trifluoride and various boron trifluoride complexes.

In some embodiments, the pre-coated particulates of the present disclosure may be used in conjunction with a fracturing operation utilizing a fracturing fluid. As discussed above, the pre-coated particulates of the present disclosure may be present in the fracturing fluid, or they may be present in another treatment fluid used in conjunction with the fracturing fluid (e.g., to divert the fracturing fluid or to promote fluid loss control of the fracturing fluid).

Fracturing fluids may be used to stimulate a subterranean formation by creating or enhancing one or more fractures within the matrix of the subterranean formation. As used herein, the term "fractures" will refer to a series of conduits, possibly interconnected in-part with one another, that are present within the matrix of a subterranean formation and are in fluid communication with a wellbore. Such fractures may be naturally occurring, manmade, or any combination thereof. Manmade fractures may be created in the matrix of a subterranean formation by introducing the fracturing fluid to a wellbore at or above the subterranean formation's fracture gradient pressure. One of ordinary skill in the art will be able to determine the fracture gradient pressure for a given type of subterranean formation.

In more particular embodiments, a fracturing fluid may be viscosified with a suitable viscosifying or gelling agent in order to suspend one or more particulates therein, such as the pre-coated particulates of the present disclosure and/or proppant particulates intended to hold a fracture in an open state. Suitable gelling agents or viscosifying agents for use in conjunction with a fracturing fluid are not believed to be particularly limited and may comprise materials such as, for example, crosslinkable polysaccharides, synthetic polymer gelling agents or viscoelastic surfactants. More particular examples of gelling or viscosifying agents may include, for example, cellulose or cellulose derivatives, guar or guar derivatives, xanthan, succinoglycan, and the like. The concentration of the gelling agent in the fracturing fluid may range between about 0.1% and about 10% by weight of the fracturing fluid and may be selected to provide a desired degree of viscosification for transport of proppant particulates and/or the pre-coated particulates. When crosslinking of the viscosifying or gelling agent is desired, suitable crosslinking agents may include various transition metal ions (e.g., zirconium ions, titanium ions, chromium ions, and the like), main group metal ions (e.g., calcium ions, magnesium ions, and antimony ions), borate ions, crosslinking polymers, and the like. The concentration of the crosslinking agent in the treatment fluid may range between about 0.005% and about 1% by weight of the treatment fluid and may be selected to provide a desired degree of viscosification. The crosslinking agent may be selected such that viscosification is promoted under the particular chemical and thermal conditions to which the fracturing fluid is exposed.

Proppant particulates suitable for inclusion in a fracturing fluid used are not believed to be particularly limited. Illustrative proppant particulates that may be used in conjunction with pre-coated particulates of the present disclosure include, for example, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material in which suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, the like, and any combination thereof. The mean particulate size of the proppant particulates generally may range from about 2 mesh to about 400 mesh on the U.S. Sieve Series, although other sizes or mixtures of sizes may be desirable in certain embodiments. The proppant particulates may be substantially spherical materials, fibrous materials, polygonal materials (such as cubic materials), irregular shapes, and any combination thereof.

In some embodiments, a small quantity of a proppant-free treatment fluid may be introduced to the wellbore prior to a fracturing fluid containing proppant particulates. Such proppant-free treatment fluids will be referred to herein as "pad fluids." Pad fluids may also be introduced to the wellbore at or above the fracture gradient pressure and initiate one or more fractures in the matrix of the subterranean formation. The subsequently introduced fracturing fluid may complete the fracturing process, and the proppant particulates in the fracturing fluid may hold the generated fractures in their open state. The pad fluid may be compositionally the same as that of the fracturing fluid, other than lacking proppant particulates, or it may differ in composition. In some embodiments, the pre-coated particulates of the present disclosure may be included in the pad fluid. When the pre-coated particulates are included in the pad fluid, the pre-coated particulates may divert the fracturing fluid to a desired location of the subterranean formation such that fracturing occurs at the location to which the fracturing fluid is diverted In some embodiments, methods of the present disclosure may comprise de-viscosifying a fracturing fluid. De-viscosification may take place inherently upon extended exposure of the fracturing fluid to the conditions that are present in the wellbore, or a breaker may be added to facilitate the de-viscosification process. Suitable breakers will be familiar to one having ordinary skill in the art and may be chosen based upon the type of viscosifying agent that is present. In non-limiting embodiments, suitable breakers may include, for example, acids, oxidizing agents, and the like.

In other various embodiments, systems configured for delivering a treatment fluid containing pre-coated particulates of the present disclosure to a downhole location are described herein. In various embodiments, the systems can comprise a pump fluidly coupled to a tubular, the tubular containing a treatment fluid comprising a carrier fluid and a plurality of pre-coated particulates, where the pre-coated particulates comprise a latently dissolvable core and a transient coating surrounding the latently dissolvable core. In more particular embodiments, latently dissolvable core may comprise a material that is soluble in the carrier fluid and differs from the transient coating. In still more particular embodiments, the treatment fluid may comprise an aqueous carrier fluid and the latently dissolvable core may comprise a material that is soluble in the aqueous carrier fluid.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a treatment fluid of the present disclosure to a subterranean formation at or above a fracture gradient of the subterranean formation, but it may also be used in cases where fracturing is not desired. The treatment fluids described herein may be introduced with a high pressure pump, or they may be introduced following a treatment fluid that was introduced with a high pressure pump. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of a treatment fluid before it reaches the high pressure pump. Alternately, the low pressure pump may be used to directly introduce the treatment fluid to the subterranean formation.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 2:
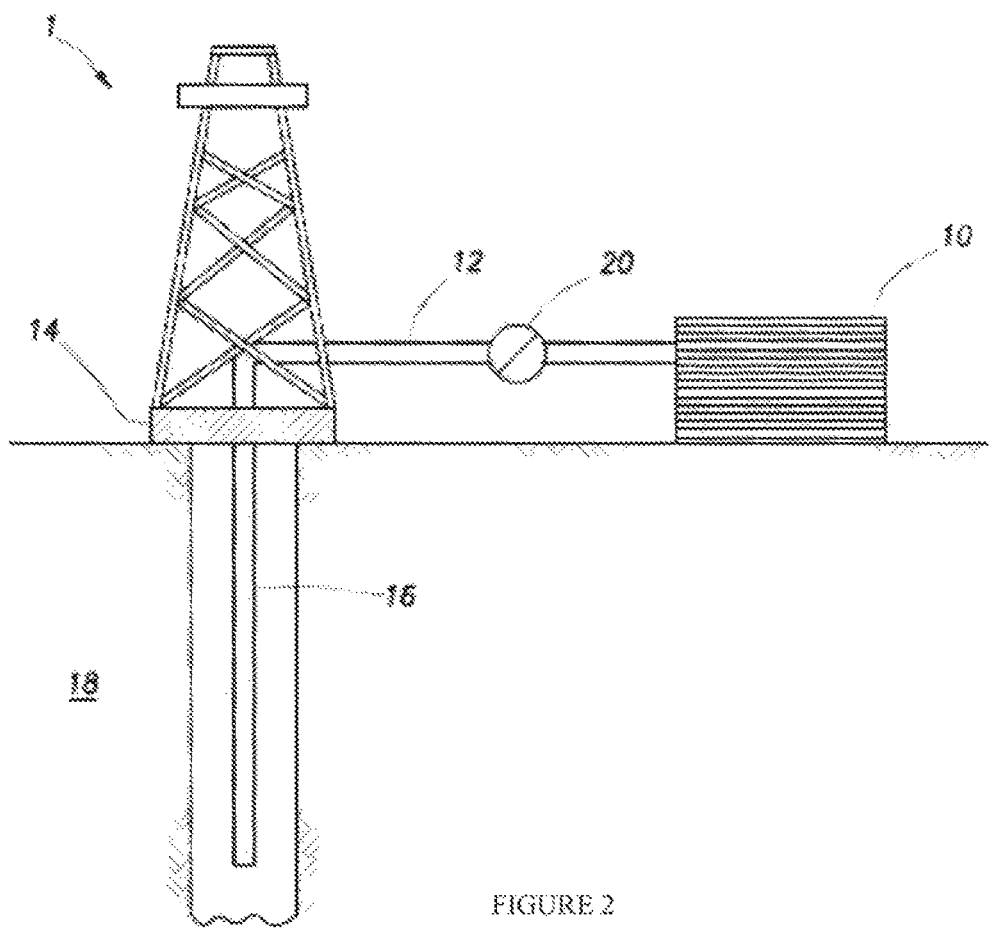
FIG. 2 shows an illustrative schematic of a system that can deliver treatment fluids of the present disclosure to a downhole location, according to one or more embodiments.

FIG. 2 shows an illustrative schematic of a system that can deliver treatment fluids of the present disclosure to a downhole location, according to one or more embodiments. It should be noted that while FIG. 2 generally depicts a land-based system, it is to be recognized that like systems may be operated in subsea locations as well. As depicted in FIG. 2, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the treatment fluid to enter into the wellbore. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

Embodiments disclosed herein include:

A. Methods for using degradable, pre-coated particulates in a wellbore. The methods comprise: providing pre-coated particulates comprising a latently dissolvable core and a transient coating surrounding the latently dissolvable core, the latently dissolvable core and the transient coating comprising different materials; and introducing a treatment fluid comprising a carrier fluid and a plurality of the pre-coated particulates into a wellbore penetrating a subterranean formation; wherein the treatment fluid is introduced into the wellbore in conjunction with a stimulation operation, and a material comprising the latently dissolvable core is soluble in the carrier fluid or a formation fluid present within the subterranean formation.

B. Methods for using degradable, pre-coated particulates in a wellbore. The methods comprise: providing a treatment fluid comprising an aqueous carrier fluid and a plurality of pre-coated particulates, the pre-coated particulates comprising a latently dissolvable core and a transient coating surrounding the latently dissolvable core; wherein the latently dissolvable core comprises a material that is soluble in the aqueous carrier fluid and differs from the transient coating; introducing the treatment fluid into a wellbore penetrating a subterranean formation; and diverting a fluid with at least a portion of the pre-coated particulates from a first location of the subterranean formation to a second location of the subterranean formation.

C. Treatment fluids comprising degradable, pre-coated particulates. The treatment fluids comprise: a carrier fluid; and a plurality of pre-coated particulates, the pre-coated particulates comprising a latently dissolvable core and a transient coating surrounding the latently dissolvable core; wherein the latently dissolvable core comprises a material that is soluble in the carrier fluid and differs from the transient coating.

D. Systems for introducing degradable, pre-coated particulates into a wellbore. The systems comprise:

Each of embodiments A-D may have one or more of the following additional elements in any combination: a pump fluidly coupled to a tubular, the tubular containing a treatment fluid comprising a carrier fluid and a plurality of pre-coated particulates, the pre-coated particulates comprising a latently dissolvable core and a transient coating surrounding the latently dissolvable core; wherein the latently dissolvable core comprises a material that is soluble in the carrier fluid and differs from the transient coating.

Element 1: wherein at least a portion of the pre-coated particulates divert a fluid during the stimulation operation from a first location of the subterranean formation to a second location of the subterranean formation.

Element 2: wherein the pre-coated particulates divert a fracturing fluid or an acidizing fluid.

Element 3: wherein the treatment fluid comprising the plurality of the pre-coated particulates is introduced into the wellbore before the fracturing fluid or the acidizing fluid.

Element 4: wherein the plurality of the pre-coated particulates are present in the fracturing fluid or the acidizing fluid.

Element 5: wherein the carrier fluid comprises an aqueous fluid and the latently dissolvable core comprises a water-soluble salt.

Element 6: wherein the latently dissolvable core comprises rock salt.

Element 7: wherein the carrier fluid comprises an aqueous fluid and the latently dissolvable core comprises a sugar.

Element 8: wherein the transient coating comprises a material that degrades, dissolves, melts or any combination thereof in the wellbore.

Element 9: wherein the transient coating comprises a material selected from the group consisting of a lipid, a wax, an enteric coating, a degradable polymer, and any combination thereof.

Element 10: wherein the transient coating comprises a degradable polymer selected from the group consisting of polylactic acid, polyglycolic acid, poly(vinylidene chloride), poly(cyclopentadiene), latex, shellac, methylcellulose, ethylcellulose, and any combination thereof.

Element 11: wherein the method further comprises removing the transient coating from the pre-coated particulates in the wellbore, hereby exposing a surface of the latently dissolvable core; and dissolving the latently dissolvable core after the fluid has been diverted.

Element 12: wherein the aqueous carrier fluid dissolves the latently dissolvable core.

Element 13: wherein a formation fluid present within the subterranean formation dissolves the latently dissolvable core.

Element 14: wherein the latently dissolvable core comprises a water-soluble salt.

Element 15: wherein the latently dissolvable core comprises a sugar.

Element 16: wherein the carrier fluid comprises an aqueous carrier fluid.

By way of non-limiting example, exemplary combinations applicable to method A include: The method of A in combination with: elements 1 and 2; elements 1-3; elements 1, 2 and 4; elements 1 and 5; elements 1, 2 and 5; elements 1, 2, and 7; elements 5 and 6; elements 5 and 8; elements 5 and 9; elements 5, 6, and 8; elements 5, 6, and 9; elements 5, 6, and 10; elements 1, 2, 5, and 9; and, elements 1, 2, 5, and 10.

By way of non-limiting example, exemplary combinations applicable to method B include: The method of B in combination with: elements 2 and 12; elements 2 and 13; elements 2 and 14; elements 2, 6, and 14; elements 2 and 15; elements 2 and 3; elements 2 and 4; elements 6 and 9; elements 6 and 10; elements 11 and 12; elements 11 and 13; elements 11, 12, and 14; elements 6, 11, 12, and 14; elements 11, 12, and 15; elements 9 and 14; elements 9, 10, and 14; and elements 6, 9, 10, and 14.

By way of non-limiting example, exemplary combinations applicable to treatment fluid C include: The treatment fluid of C in combination with: elements 14 and 16; elements 15 and 16; elements 6, 14 and 16; elements 9 and 10; elements 9 and 16; elements 9, 10 and 16; elements 9 and 14; and, elements 9 and 15.

By way of non-limiting example, exemplary combinations applicable to system D include: The system of D in combination with: elements 14 and 16; elements 15 and 16; elements 6, 14 and 16; elements 9 and 10; elements 9 and 16; elements 9, 10, and 16; elements 9 and 14; and, elements 9 and 15.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
  providing pre-coated particulates comprising a dissolvable core and a coating surrounding the dissolvable core, the dissolvable core and the coating comprising different materials,
    wherein the coating comprises an oil soluble material, wherein the coating comprises a material selected from the group consisting of a lipid, a wax, a degradable polymer selected from the group consisting of poly(vinylidene chloride), poly(cyclopentadiene), shellac, methylcellulose, ethylcellulose, and any combination thereof, an enteric coating, and any combination thereof;

introducing the pre-coated particulates into a carrier fluid thereby forming a treatment fluid; and introducing the treatment fluid into a wellbore penetrating a subterranean formation;

wherein the coating dissolves in the wellbore thereby exposing a surface of the dissolvable core, wherein the coating dissolves in the wellbore in about 1 hour to about 3 hours after introduction to the subterranean formation; and wherein the treatment fluid is introduced into the wellbore in conjunction with a stimulation operation, and a material comprising the dissolvable core is soluble in the carrier fluid or a formation fluid present within the subterranean formation.

2. The method of claim 1, wherein at least a portion of the pre-coated particulates divert a fluid during the stimulation operation from a first location of the subterranean formation to a second location of the subterranean formation.

3. The method of claim 2, wherein the pre-coated particulates divert a fracturing fluid or an acidizing fluid.

4. The method of claim 3, wherein the treatment fluid comprising the plurality of the pre-coated particulates is introduced into the wellbore before the fracturing fluid or the acidizing fluid.

5. The method of claim 3, wherein the plurality of the pre-coated particulates are present in the fracturing fluid or the acidizing fluid.

6. The method of claim 1, wherein the carrier fluid comprises an aqueous fluid and the dissolvable core comprises a water-soluble salt.

7. The method of claim 6, wherein the dissolvable core comprises rock salt.

8. The method of claim 1, wherein the carrier fluid comprises an aqueous fluid and the dissolvable core comprises a sugar.

9. The method of claim 1, wherein the coating comprises a material that degrades, dissolves, melts or any combination thereof in the wellbore.

10. A method comprising:

providing a plurality of pre-coated particulates, wherein each of the pre-coated particulates comprises a dissolvable core and a coating surrounding the dissolvable core;

introducing the plurality of pre-coated particulates into a treatment fluid comprising an aqueous carrier fluid;

wherein the dissolvable core comprises a material that is soluble in the aqueous carrier fluid and differs from the coating, wherein the coating comprises an oil soluble material, wherein the coating comprises a material selected from the group consisting of a lipid, a wax, a degradable polymer selected from the group consisting of poly(vinylidene chloride), poly(cyclopentadiene), shellac, methylcellulose, ethylcellulose, and any combination thereof, an enteric coating, and any combination thereof;

introducing the treatment fluid into a wellbore penetrating a subterranean formation;

dissolving at least a portion of the coating material in the wellbore thereby exposing a surface of the dissolvable core, wherein the coating dissolves in the wellbore in about 1 hour to about 3 hours after introduction to the subterranean formation; and diverting a fluid with at least a portion of the pre-coated particulates from a first location of the subterranean formation to a second location of the subterranean formation.

11. The method of claim 10, wherein the coating comprises a substance that degrades, dissolves, melts or any combination thereof in the wellbore.

12. The method of claim 11, further comprising:

dissolving the dissolvable core after the fluid has been diverted.

13. The method of claim 12, wherein the aqueous carrier fluid dissolves the dissolvable core.

14. The method of claim 12, wherein a formation fluid present within the subterranean formation dissolves the dissolvable core.

15. The method of claim 10, wherein the dissolvable core comprises a water-soluble salt.

16. The method of claim 10, wherein the dissolvable core comprises rock salt.

17. The method of claim 10, wherein the dissolvable core comprises a sugar.

* * * * *